Dec. 5, 1961  F. B. NEARY  3,011,400
SPECTACLE FRAME
Filed Oct. 31, 1957
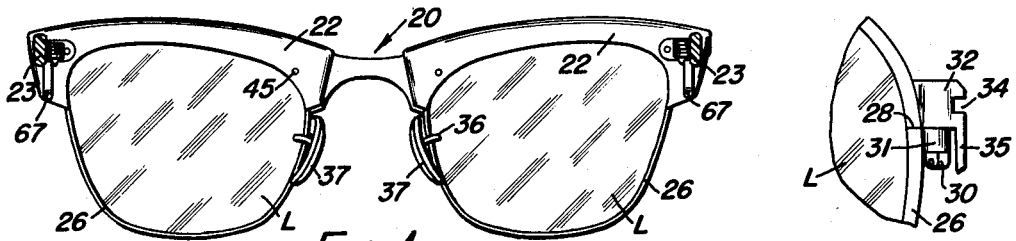
FIG. 1.
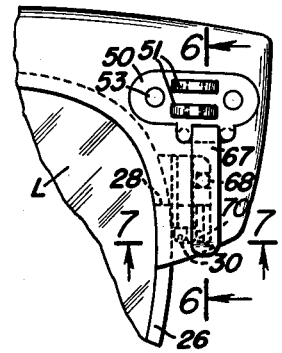
FIG. 3.
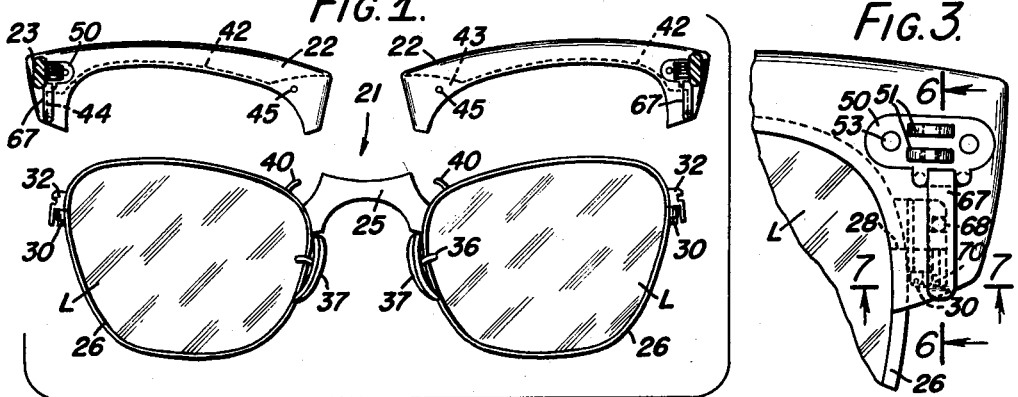
FIG. 2.
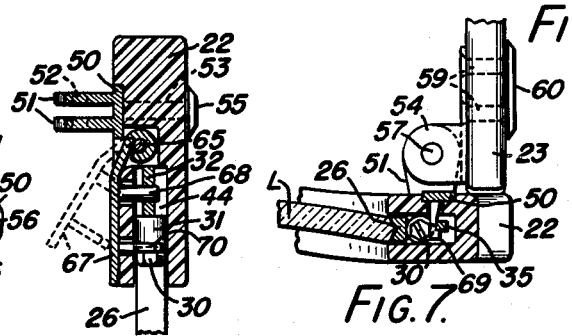
FIG. 4.
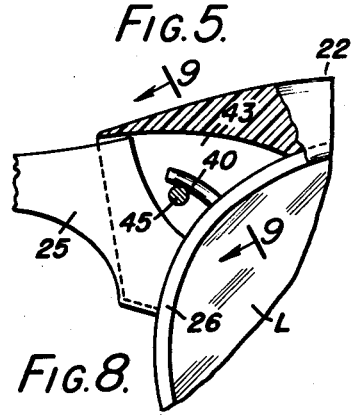
FIG. 5.  FIG. 6.
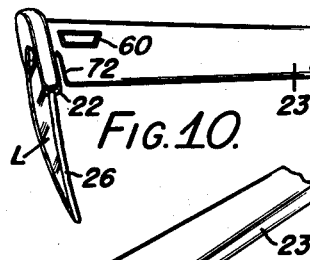
FIG. 7.
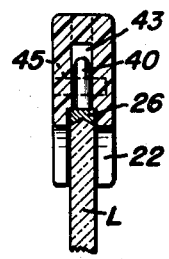
FIG. 8.  FIG. 9.
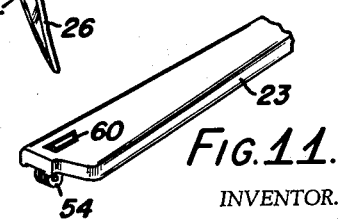
FIG. 10.
FIG. 11.
INVENTOR.
FRANCIS B. NEARY
BY
ATTORNEY

United States Patent Office 3,011,400
Patented Dec. 5, 1961

3,011,400
SPECTACLE FRAME
Francis B. Neary, Rochester, N.Y., assignor, by mesne assignments, to Textron Inc., Providence, R.I., a corporation of Rhode Island
Filed Oct. 31, 1957, Ser. No. 693,730
4 Claims. (Cl. 88—41)

The present invention relates to spectacle frames and more particularly to combination metal and plastic spectacle frames. In a more specific aspect, the invention relates to that type of combination metal and zylonite spectacle frame in which the lenses are mounted in a metal chassis which includes the bridge, and there are plastic overlays or semi-rims secured to the chassis which extend over the top edges of the lenses.

Combination metal and plastic spectacle frames are very popular today because they afford color and variety in design while providing a good, secure mounting for the lenses. However, such combination frames, as I am aware of, which are on the market, and which have a metal lens-carrying chassis and ornamental plastic overlays or semi-rims, have the plastic overlays or top rims fixedly secured to the metal chassis.

Many persons like to have at hand, ready for optional use, spectacles of different colors and/or designs to harmonize with different dress accessories or different apparel, or to suit different occasions or purposes. Heretofore, since conventional combination spectacle frames are made so that the lenses are permanently fixed therein, manufacturers of spectacle frames, opticians, and optometrists have had to maintain large inventories of various sizes, colors, designs, and shapes of spectacle frames in order to satisfy the requirements and tastes of the public. Moreover, any individual spectacle user, who has desired to have spectacle frames of different colors, and/or designs, has had to buy the corresponding number of complete spectacles, lenses included. This is expensive because the cost of the lenses constitutes a large part of the cost of any spectacle.

The metal chassis ordinarily comprises a pair of metal eyewires which carry the lenses of the spectacle, and which are secured to the bridge thereof. The eyewires are soldered at their nasal ends to the bridge. They are secured about the lenses by screws, each eyewire being provided at its ends with opposed tubes, and a screw being passed through one of these tubes and being threaded into the other. These screws are ordinarily round-headed screws, and not infrequently, after the spectacle has been subjected to some use, become loose. The screws are very small, and while they are easily threaded back into holding position, or replaced, it usually requires a trip to an optician or an optometrist to replace a screw, or to thread it back into place, because the average person does not have a screwdriver, or any other instrument small enough to engage and drive the screw into place. This is an annoyance; and heretofore, it has been virtually impossible to get an optometrist or optician to put a lock washer on the screw.

Different suggestions have been made at various times for providing combination metal and plastic spectacle frames with removable lenses, so that the lenses could be removed from one frame by the wearer, and inserted in another frame. None of these prior proposals have achieved commercial success because few people are good enough mechanics to be successful in assembling such delicate mechanisms as ophthalmic mountings. Professional practitioners, such as ophthalmologists and optometrists, moreover, do not look with favor on patients changing lenses from one frame to another. They fear that the patient may upset the fine correction required for satisfactory functioning of a prescription, which has been carefully worked out to meet the exact conditions found in refraction of an individual patient's eyes. They fear that the corrective lenses will not function as they are supposed to, with consequent discomfort to the patient, or in extreme cases, perhaps actual damage to the patient's vision, if the patient starts changing lenses from one spectacle frame to another himself.

Furthermore, such spectacle frames as have heretofore been proposed for the purpose are apt to become worn, so that a lens may become optically displaced, or drop out, or be broken. In some cases, the proposed frame construction has been fragile, the design embodying such small and delicate working parts that the over-all construction will not stand up under the comparatively rough handling to which optical wear is subjected, to say nothing of the additional strain on the working parts which necessarily results from continuous interchange of lenses. In many instances, moreover, the parts, which must be manipulated in order to effect interchange of the lenses, have been so small that anyone, who needs to wear glasses, would have difficulty in interchanging those lenses without wearing his or her glasses, which obviously would be an impossibility during the interchange of the lenses.

One object of the present invention is to provide a spectacle frame structure which will permit interchange of lenses so that with but a single pair of lenses a plurality of different spectacle frames can be built up, or assembled.

Another object of the invention is to provide a spectacle frame structure such that, while using only a single pair of lenses, a person can nevertheless form selectively and at will a plurality of different spectacle frames of different color and design to harmonize, as desired, with a particular costume, or to suit a particular occasion.

Another object of the invention is to provide a spectacle frame construction, which will enable anyone, to use interchangeably different sets of lenses, for instance, clear lenses and sunglasses, with a given frame.

Another object of the invention is to provide a spectacle frame construction which will permit interchange of lenses while insuring that the axes of the lenses are in correct optical position when assembled in the frame.

Another object of the invention is to provide a spectacle frame of the type described in which the decorative portion may be made of plastic or other non-metallic material while the lens holder itself is made of metal, and in which the lens holder may be so mounted removably in the plastic part of the frame as to hold the lenses firmly and securely in correct optical position.

Another object of the invention is to provide a spectacle frame construction for interchangeable lenses, which is simple enough for a person, who cannot see well without glasses, to make a change of lenses from one spectacle frame to another readily by sense of touch, even in the dark.

Another object of the invention is to provide a spectacle frame mounting for interchangeable lenses in which the lenses are mounted in protective rims to limit possibility of breakage if the lenses are dropped while the owner is changing them from one frame to another.

A further object of the invention is to provide a spectacle construction of the type described in which the lenses themselves are removably mounted in holders which are removably mounted in frames so that not only may a single pair of lenses be transferred from frame to frame, but the lenses themselves may be changed as, for instance, when obsoleted, without obsoleting the frames themselves.

Another object of the invention is to provide a spectacle frame of the character described having means for securing the screws, which fasten the eyewires together about the respective lenses, against rotation, so that they will not accidentally become loosened.

Another object of the invention is to provide a spectacle frame of the character described, in which the means for securing the respective plastic overlays or top rims to the lens-chassis also serve to prevent the screws, which fasten the eyewires about the lenses, from unintentionally loosening.

Another object of the invention is to afford a spectacle frame construction that is in every way practical and that can be manufactured economically so that any person can, in effect, have available as many ornamental frames as desired by purchasing a single pair of lenses, a single chassis for supporting those lenses, and sufficient interchangeable plastic overlays or semi-rims to provide the desired number of ornamental frames.

Still another object of the invention is to provide a spectacle frame of the character described having improved means for securing the non-metallic parts of the frame to the metallic parts thereof, and which will facilitate change of lenses from one frame to another.

A still further object of the invention is to provide an improved spectacle frame of the type described which will be durable in construction and easy to use.

Other objects of the invention will be apparent hereinafter from the specification and from the recital of the appended claims.

In the drawing:

FIG. 1 is a rear elevation, with the temples broken away, of a spectacle frame made according to one embodiment of this invention;

FIG. 2 is an exploded view showing the zylonite overlays or semi-rims of this frame separated from the metallic chassis which carries the lenses;

FIG. 3 is a fragmentary rear view on an enlarged scale showing particularly the anchor tube for one of the eyewires of the frame;

FIG. 4 is a fragmentary rear view showing a plastic overlay or semi-rim mounted over the eyewire, and showing the retaining latch in engaged position, the temple being removed;

FIG. 5 is a perspective view of one of the hinge members of the frame and of the associated latch member;

FIG. 6 is a section on the line 6—6 of FIG. 4 looking in the direction of the arrows;

FIG. 7 is a section on the line 7—7 of FIG. 4 looking in the direction of the arrows;

FIG. 8 is a fragmentary view on an enlarged scale, partially broken away, showing the means for connecting one of the plastic overlays or semi-rims at its nasal side to the metallic chassis;

FIG. 9 is a fragmentary section taken on the line 9—9 of FIG. 8 looking in the direction of the arrows;

FIG. 10 is a side elevation on the same scale as FIGS. 1 and 2 of the spectacle frame, part of the temple being broken away; and FIG. 11 is a fragmentary perspective view of a temple.

Referring now to the drawing by numerals of reference, 20 denotes generally the spectacle mounting. This mounting includes a metallic chassis 21, a pair of plastic toparms or semi-rims 22, and a pair of temples 23. The temples are shown only fragmentarily.

The metallic chassis comprises a bridge 25, and a pair of lens holders or eyewires 26. The eyewires hold the lenses L of the spectacle. Each is made of a suitable metal, for instance, gold, or gold-filled, and is shaped to encircle and enclose one of the lenses L. Each eyewire is split, as denoted at 28 (FIG. 3) so that it may be opened to permit insertion into it or removal from it of a lens L. Each eyewire is secured together about its lens by a hex-headed screw 30. Each screw is passed through a lug or tube 31 that is soldered or otherwise joined to one end of the associated eyewire; and it threads into an anchor lug or tube 32 that is soldered or otherwise secured to the other end of the associated eyewire, to abut against the tube 31 when the screw is threaded home into the associated anchor tube 32.

The anchor tube 32 is of special construction. It has a flat lateral projection which is provided with a notch 34 (FIG. 3) in its outside edge; and it has a depending locking arm 35 which extends downwardly generally parallel to the tube 31 to a position abreast of or below the head of the screw 30 when the screw is fully threaded into the anchor tube 32.

The eyewires are soldered or otherwise secured to the bridge 25, which may be made of gold, or other metal; and, in effect, the eyewires and the bridge are integral with one another and constitute a metal chassis holding securely a pair of lenses.

Each of the eyewires has an arm 36 soldered or otherwise secured to it which carries a conventional nasal pad 37.

Each of the eyewires also has a hook 40 soldered, or otherwise secured to it adjacent the nasal end of the top portion of the eyewire. The two hooks 40 project toward each other, and toward the body portion of the bridge 25.

Each plastic overlay or top rim 22 is grooved in its bottom face, as denoted at 42 (FIG. 2), to receive and to conceal the upper reach of the associated eyewire 26. Each overlay or semi-rim is also grooved along its nasal edge as denoted at 43 (FIGS. 2 and 8), to straddle and conceal the hook 40 and the adjacent portion of the bridge 25. Each overlay or semi-rim is further recessed at its temporal end as denoted at 44 (FIGS. 2 and 6), to receive the tubes 31 and 32 of the eyewire, and the parts associated therewith, as will be described further hereinafter. The grooves 43 and 44 communicate with the groove 42 in each overlay or top rim.

Secured in each overlay or top rim 22 to extend transversely of the groove 43 is a pin 45 (FIGS. 2 and 8). The hooks 40 are adapted to engage over the pins 45 to secure the semi-rims at their nasal ends detachably to the metal lens-carrying chassis.

Each overlay or semi-rim 22 is recessed on its back face adjacent its temporal edge to receive a hinge plate 50 (FIGS. 2, 4, 5, 6, and 7). Each hinge plate 50 is formed on its rear face with two parallel, rearwardly-projecting ears 51, which are drilled, as denoted at 52, to receive a hinge pin 57 by means of which the hinge plate 50 is hingedly connected with that part 54 of the hinge which is fastened to the associated temple or bow 23 of the spectacle.

Each hinge plate 50 may be secured to its semi-rim or overlay 22 by means of rivets 53 (FIG. 4) that are integral with the decorative shield 55 (FIG. 6) that is located against the front face of the semi-rim. The rivets 53 pass through the associated plastic semi-rim 22, and through the holes 56 (FIG. 5) in the associated hinge plate 50, and are anchored in the associated hinge plate 50, so that none of the strains on the hinge are transmitted to the plastic of the associated semi-rim. The temples 23 are secured in similar manner to the hinge plates 54, each hinge plate 54 being secured to its temple 23 by rivets 59 that are integral with a decorative shield or plaque 60 which is located against the outside face of the temple (FIGS. 10 and 11).

Soldered or otherwise secured to each hinge plate 50 is a U-shaped bar 65 which extends forwardly from the hinge plate into a recess (FIG. 6) in the associated top rim, that communicates with the grooves 44 and 42 thereof. Pivotally mounted on the transverse portion of each bar 65 is a latch 67. One end of the latch is curled on itself, as clearly shown in FIG. 6, to engage around the transverse portion of the bar 65 to form the pivotal connection. Each latch member has two pins 68 and 69 (FIG. 5) projecting forwardly therefrom at right angles to the pivotal axis of the latch, and spaced from one another and from said pivotal axis. The pin 68 of each latch is adapted to engage in the notch or catch 34 of the associated anchoring tube 32 when the latch is swung down from the dotted line position shown in FIG. 6 to the full line position shown in that figure. The pin 69 is notched on its laterally outside face as indicated at 70 (FIG. 5). When the latch is swung down into operative position, this pin enters between the arm 35 of the associated anchoring tube 32, and the adjacent face of the head of the screw 30, as shown in FIG. 7, thereby to wedge the latch in locking position, and simultaneously to lock the screw 30 against rotation. With the present invention, therefore, the locking means for securing a semi-rim or overlay on the chassis becomes simultaneously the means for locking the fastening screw of the associated eyewire against involuntary rotation.

In assembling the spectacle, the lenses are inserted in the two eyewires 26. Then each screw 30 is passed through the tube 31 of the associated eyewire and threaded home into the anchor tube 32 thereof. Then the pin 45 of one of the semi-rims 22 is engaged under one of the hooks 40 of the chassis, and the semi-rim is rocked down to seat the upper reach of the associated eyewire in the groove 42 of the semi-rim and to position the groove 44 over the associated tubes 31 and 32. Then the associated latch 67 is rocked downwardly from the dotted line position of FIG. 6 to the full line position of that figure to engage the pin 68 in the notch 34 of the associated anchor tube 32, and to engage the pin 69 between the arm 35 of that anchor tube and the head of the associated screw 30. In similar manner the other semi-rim is secured to the other eyewire at the opposite side of the bridge.

The depending arm 35 of each anchor tube 32 is close enough to the associated tube 31 and to the head of the associated screw 30 to wedge the pin 69 between the associated arm 35 and the screw head to resiliently and frictionally lock the latch 67 in place and at the some time to hold the associated screw 30 against rotation.

To remove the overlays or top rims from the chassis, all that is required is to insert the thumbnail under each latch 67, and rock the latch upwardly to unlock the overlay or semi-rim from the metal chassis at the temporal end of the overlay or semi-rim. Then the overlay or semi-rim is rocked upwardly to disengage its pin 45 from the associated hook 40.

The respective temples 23 are hinged to the respective overlays or semi-rims so that they are removed from or placed on the chassis when the semi-rims are removed from or placed on the chassis, respectively. To clear the latches, each temple is notched, as denoted at 72 (FIG. 10).

From the obove description, it will be seen that any user of eyeglasses can with mountings constructed according to the present invention, readily change a set of semi-rims of one color or design, for a set of another color, or design, and can just as readily change a set of semi-rims from one pair of lens mounts to another, as, for instance, from a chassis carrying clear lenses to a chassis carrying sun or dark glasses. Because the lenses remain in the lens mount during the change of the semi-rims, there is no danger of the user upsetting the fine correction required for satisfactory functioning of the lenses. The metal chassis insures that the axes of the lenses cannot be turned from the correct position in the frame. Because the lenses are mounted in a metal chassis, the mounting is stable. The supporting chassis, moreover, limits possibility of breakage of the lenses should they be dropped during interchange.

Because the semi-rims are held on the chassis by latches that are readily operable manually it takes but an instant to change semi-rims from one mounting to another, or to take off one set of semi-rims from a mounting and replace the set with another. Thus, with the present invention a lady can change the color of her spectacles to suit the color of her dress by simply taking off one set of semi-rims and replacing them with a set of a suitable color. For evening wear, the lady can use a more elaborate set of semi-rims than for workday use. Furthermore, a person can purchase two mountings, one for clear lenses, and another for sunglasses, for instance, and change semi-rims from one mounting to another to suit his or her pleasure or convenience.

The latch can be manipulated in the dark by any person. It is not required to be wearing glasses in order to change semi-rims on a chassis. A person does not have to be a mechanic to remove a set of semi-rims from a chassis and to assemble another set thereon. The mounting is foolproof and simple enough in operation so that a person who cannot see well without glasses can make a change of semi-rims readily, solely by the sense of touch. There are no parts to get out of order. No tool whatsoever is required in shifting a set of semi-rims from one chassis to another, or in changing one set of semi-rims for another.

Obviously, instead of providing separate top arms or overlays for each lens holder, the two top arms could be made as one piece integral with a plastic bridge, and the whole top piece, comprising bridge and top arms, could be secured to the eyewires by latches 67. The latches 67 again would serve two purposes, namely, securing of the top arms to the eyewires and locking of the screws of the eyewires. Other modifications of the invention are also possible.

While the invention has been described, then, in connection with one embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A spectacle mounting comprising a pair of metallic eyewires, each being split and adapted to surround a lens and each having a pair of tubular lugs at its opposite ends, a screw positioned in the lower lug of each eyewire and threadedly engaging the upper lug of the eyewire to fasten the split eyewire about the lens mounted therein, said screw having at its lower end a head of polygonal shape in cross-section, said upper lug having a locking arm protruding therefrom and extending alongside said lower lug and the head of said screw and laterally spaced from said lower lug and the head of said screw, a plastic top arm associated with each eyewire and fitting over the top portion of the associated eyewire, means for detachably securing each top arm at its nasal end to the associated eyewire, and means for detachably securing each top arm at its temporal end to its associated eyewire comprising a catch on said upper lug of the eyewire, a latch pivotally mounted on the top arm, means carried by said latch for engaging said catch, and a pin carried by said latch and positioned to be wedged between said locking arm and a side of the head of said screw, when said latch-carried means is in engagement with said catch, to hold said screw against rotation.

2. A spectacle mounting comprising a metallic chassis including a pair of metallic lens holders for holding the lenses of a spectacle, and a metallic bridge rigidly secured to the lens holders at the nasal sides thereof, a pair of spaced non-metallic top arms, each of said top arms partially encircling one of the lens holders, each lens holder comprising a split metallic eyewire adapted to surround a lens and having a pair of tubular lugs at its opposite ends, and a screw positioned in the lower lug of the eyewire and threadedly engaging the upper lug of the eyewire to fasten the eyewire about the lens mounted therein, means for detachably securing each top arm at its nasal end to the chassis, a metallic hinge plate secured to each top arm at the temporal end therof for hingedly connecting a temple thereto, and means for detachably securing each top arm at its temporal end to the chassis, each of the latter securing means comprising a latch pivotally mounted on said hinge plate for pivotal movement about an axis parallel to the plane of said hinge plate for downward swinging movement to operative position, and a catch carried by said upper lug of the associated eyewire with which said latch is engageable, and a pin secured to said latch and positioned to engage said screw to hold said screw against rotation when said latch is engaged with said catch.

3. A spectacle mounting according to claim 2 in which each catch comprises a notch in one lug of the associated eyewire, said latch has a pin thereon positioned to engage said notch when said latch is in its operative position, the screw has a head that is polygonal in cross-section, a second pin on said latch, and said second pin is positioned to engage a side of the head of the screw to prevent rotation thereof when the first-named pin on the latch is in engagement with said notch.

4. A spectacle mounting comprising a metallic chassis, and a pair of non-metallic top arms, said chassis comprising a pair of metallic eyewires, and a bridge rigidly secured to said eyewires at the nasal sides thereof, each of said top arms overlying the top of an eyewire and having a groove therein to receive the same, and each of said top arms being also slotted at its nasal end to straddle the portion of said bridge adjacent the eyewire associated with said top arm, each of said eyewires having tubular lugs at its opposite ends, a screw positioned in a first one of the lugs of each eyewire and threadedly engaging the second lug of the eyewire to fasten the eyewire about a lens, each of said screws having a head of polygonal shape in cross-section, each of said eyewires having a detent secured at its top adjacent its nasal ends, each of said top arms having a pin secured therein adjacent its nasal end to engage said detent to secure the top arm detachably at its nasal end to the associated eyewire, a hinge plate secured to each top arm adjacent its temporal end, each hinge plate having ears by which it may be hingedly connected to a temple, a latch pivotally mounted on each hinge plate below said ears for downward swinging movement about an axis parallel to the plane of said hinge plate for detachably securing the associated top arm at its temporal end to the associated eyewire, each of said first lugs having a notch at the temporal side thereof and having a depending arm extending downwardly alongside the second associated lug of the eyewire and alongside the head of the associated screw but laterally spaced from said second associated lug and from the head of the associated screw, each of said top arms having a groove therein at the temporal side of the associated eyewire and extending a substantial distance below said hinge plate to receive the lugs of the associated eyewire, said latch having two pins secured thereto, one mounted above the other and each extending in a direction perpendicular to the pivotal axis of the eyewire, the upper of said pins being positioned to engage in the notch in said first lug of the eyewire when the latch is swung downwardly to operative position, and the lower of said pins being positioned to wedge between the associated arm of said first lug of the eyewire and a side of the head of the associated screw, when the associated latch is swung downwardly to operative position, to lock said screw against rotation and to lock said latch in operative position.

References Cited in the file of this patent

UNITED STATES PATENTS

| | | |
|---|---|---|
| 291,945 | Schwarzwalder | Jan. 15, 1884 |
| 532,771 | Davis | Jan. 22, 1895 |
| 1,882,153 | Lobenstein | Oct. 11, 1932 |
| 2,738,709 | Matthews et al. | Mar. 20, 1956 |
| 2,748,654 | Rohrbach et al. | June 5, 1956 |
| 2,748,655 | Rohrbach | June 5, 1956 |
| 2,786,391 | Lutes | Mar. 26, 1957 |
| 2,831,393 | Bennett | Apr. 22, 1958 |

FOREIGN PATENTS

| | | |
|---|---|---|
| 341,327 | Great Britain | Jan. 15, 1931 |